United States Patent
Borghi et al.

(10) Patent No.: US 11,937,569 B2
(45) Date of Patent: Mar. 26, 2024

(54) APPARATUS FOR DISPENSING BEDDING INSIDE OF BREEDING CAGES FOR USE IN PHARMACEUTICAL PRECLINICAL RESEARCH CENTRES, AND METHOD OF USING SAID APPARATUS

(71) Applicant: IWT S.R.L., Casale Litta (IT)

(72) Inventors: Matteo Borghi, Legnano (IT); Michele Vitali, Angera (IT)

(73) Assignee: IWT S.R.L., Casale Litta (IT)

( * ) Notice: Subject to any disclaimer, the term of this patent is extended or adjusted under 35 U.S.C. 154(b) by 710 days.

(21) Appl. No.: 17/107,237

(22) Filed: Nov. 30, 2020

(65) Prior Publication Data

US 2021/0176953 A1    Jun. 17, 2021

(30) Foreign Application Priority Data

Dec. 11, 2019    (IT) .................. 102019000023583

(51) Int. Cl.
*A01K 1/03*        (2006.01)
*A01K 1/015*      (2006.01)
(Continued)

(52) U.S. Cl.
CPC .............. *A01K 1/031* (2013.01); *A01K 1/015* (2013.01); *B01D 46/0041* (2013.01);
(Continued)

(58) Field of Classification Search
CPC ........ A01K 1/031; A01K 1/015; A01K 39/01; A01K 5/01; A01K 29/005; A01K 39/04;
(Continued)

(56) References Cited

U.S. PATENT DOCUMENTS

| 7,325,667 B1 | 2/2008 | Damick et al. |
| 2007/0119382 A1 | 5/2007 | Austin et al. |

(Continued)

FOREIGN PATENT DOCUMENTS

| CN | 205052439 U | 3/2016 |
| EP | 1 150 559 B1 | 8/2002 |

OTHER PUBLICATIONS

Italian Search Report dated Jul. 29, 2020, issued in Italian Application No. 201900023583.

(Continued)

*Primary Examiner* — Vishal Pancholi
*Assistant Examiner* — Robert K Nichols, II
(74) *Attorney, Agent, or Firm* — Workman Nydegger (57) ABSTRACT

Apparatus configured for dispensing bedding inside of breeding cages for use in pharmaceutical preclinical research centres, including: a loading hopper located in the upper part of the apparatus, and adapted to contain the bedding to be supplied to the cages; at least one supporting plane adapted to support one or more cages, and positioned under the hopper; an actuator under the hopper, adapted to raise or lower the hopper and the at least one supporting plane; one or more dosing mouths located in the lower part of the loading hopper, and adapted to feed into the cages given quantities of bedding from the hopper; a dispensation system adapted to dispense bedding into the cages through the one or more dosing mouths; a control system adapted to determine the quantity of bedding and to control the actuator; and a base for supporting the apparatus.

9 Claims, 10 Drawing Sheets

(51) Int. Cl.
  *B01D 46/00* (2022.01)
  *B65G 33/14* (2006.01)
  *B65G 41/00* (2006.01)
  *B65G 47/19* (2006.01)
  *G01F 13/00* (2006.01)

(52) U.S. Cl.
  CPC ............. *B65G 33/14* (2013.01); *B65G 41/00* (2013.01); *B65G 47/19* (2013.01); *G01F 13/005* (2013.01); *B01D 2279/00* (2013.01); *B65G 2207/08* (2013.01); *B65G 2814/0344* (2013.01)

(58) Field of Classification Search
  CPC ............ B01D 46/0041; B01D 2279/00; B65G 33/14; B65G 41/00; B65G 47/19; B65G 2207/08; B65G 2814/0344; G01F 13/005
  See application file for complete search history.

(56) References Cited

U.S. PATENT DOCUMENTS

| | | |
|---|---|---|
| 2009/0064638 A1 | 3/2009 | Corbett et al. |
| 2010/0252566 A1* | 10/2010 | Roe ................ A01K 1/031 221/278 |
| 2016/0106059 A1 | 4/2016 | Roe |
| 2022/0177382 A1* | 6/2022 | Scott ................ C05F 3/00 |

OTHER PUBLICATIONS

Chinese Office Action dated Aug. 29, 2023, issued in Chinese Application No. 202011326087.3.

\* cited by examiner

APPARATUS FOR DISPENSING BEDDING INSIDE OF BREEDING CAGES FOR USE IN PHARMACEUTICAL PRECLINICAL RESEARCH CENTRES, AND METHOD OF USING SAID APPARATUS

CROSS-REFERENCE TO RELATED APPLICATIONS

This application claims priority to Italian Application No. 102019000023583, filed Dec. 11, 2019, which is incorporated herein by specific reference.

THE FIELD OF THE INVENTION

The present invention relates to an apparatus for dispensing bedding inside of breeding cages for use in pharmaceutical preclinical research centres, and to a method of using said apparatus.

BACKGROUND ART

In the field of the pharmaceutical preclinical research, and particularly in the field of animal breeding centres and their washing areas, where laboratory animals are bred, it is known that it is necessary to use systems for automatic bedding dispensation ensuring that the quantity of bedding in the cages is known and repeatable.

In particular, systems exist which are defined as "stand-alone" systems, wherein the operator, by simply laying the cage onto a table, can fill the cage with a known quantity of bedding.

Such systems can be used in association with robotic systems for cage handling.

Figure 1:
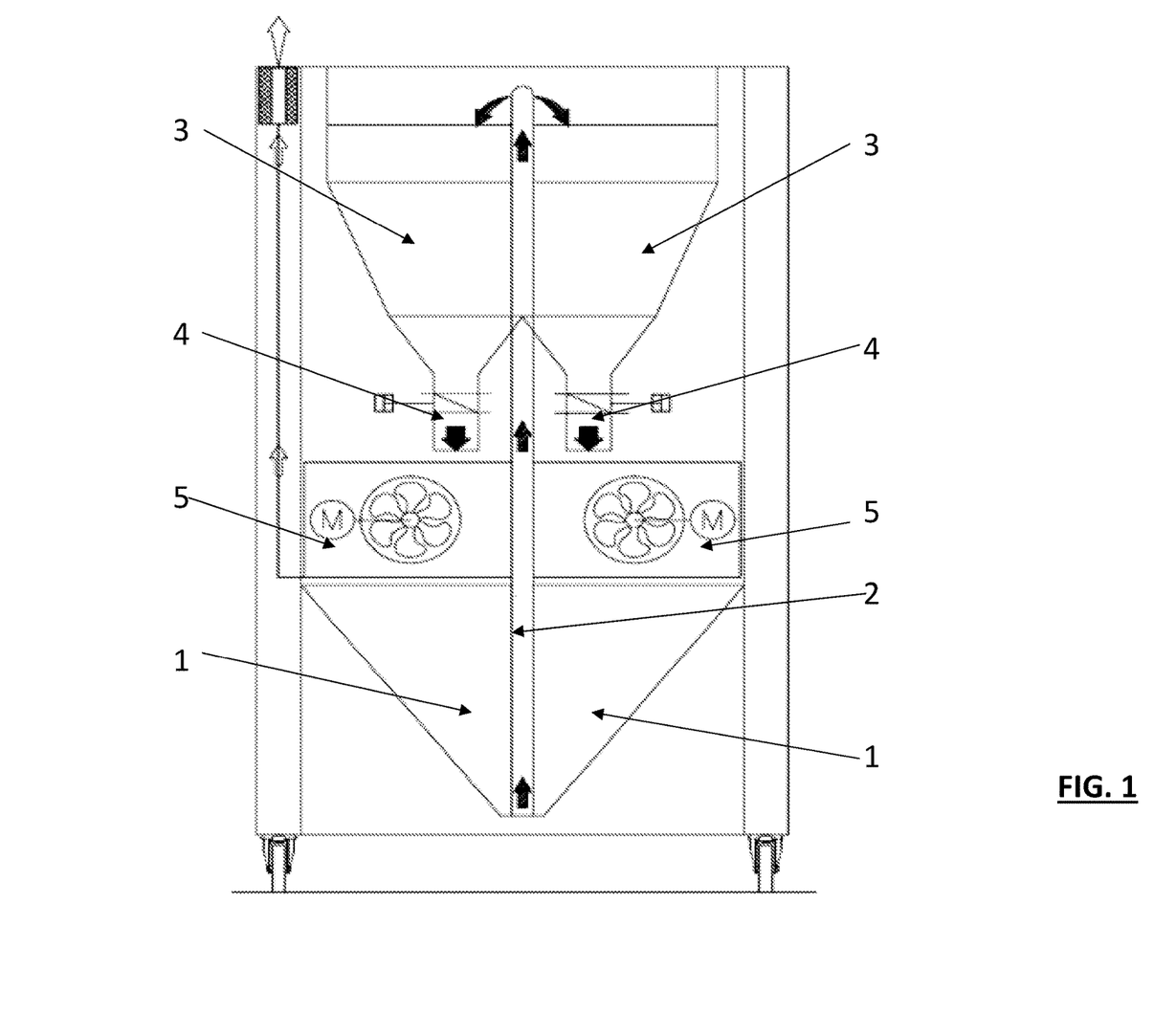
FIG. 1 shows a prior-art apparatus for dispensing bedding as described above.
Figure 2:
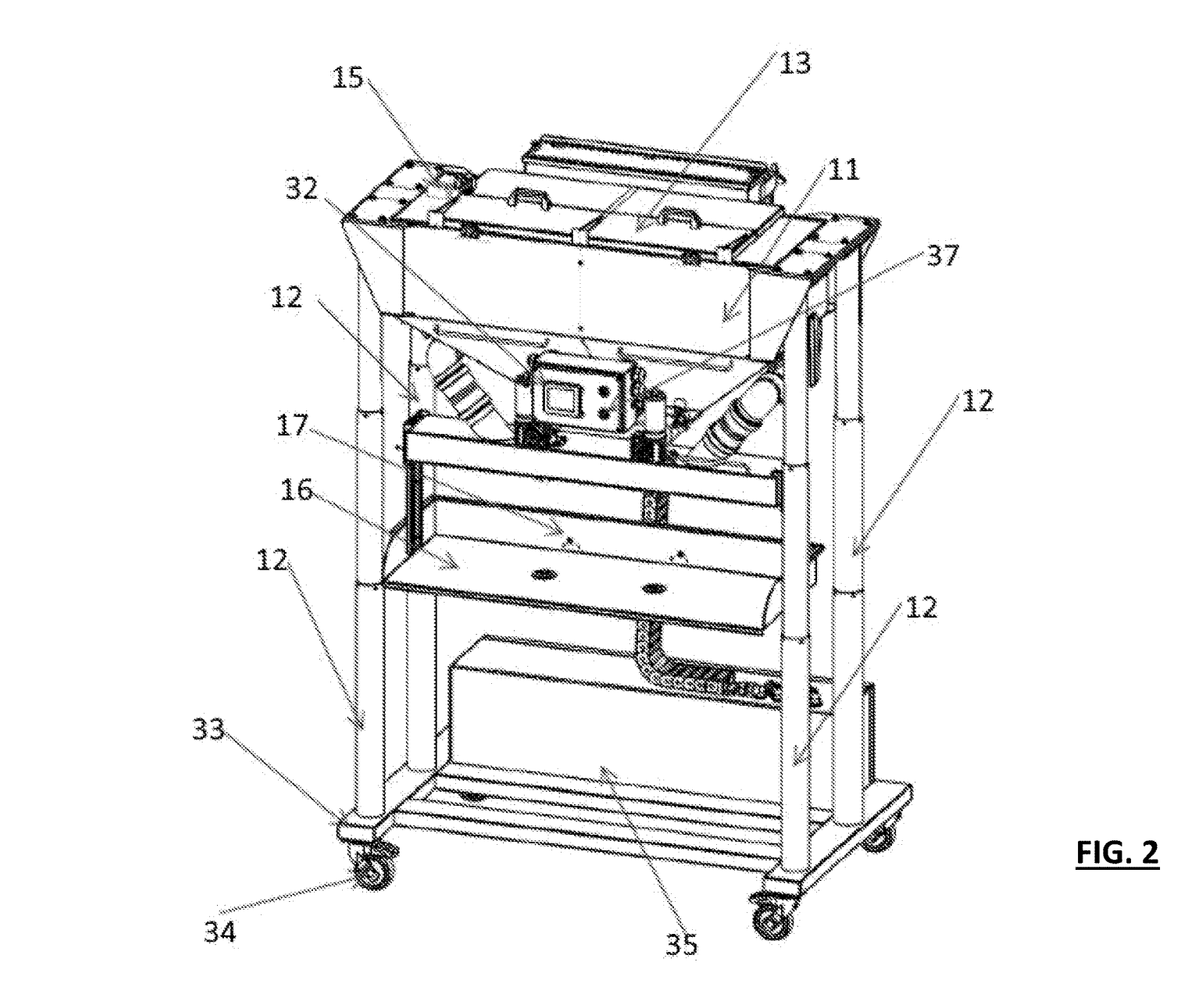
FIGS. 2 to 8 show various full perspective views or partial sectional views of the apparatus for dispensing bedding of the invention.

With reference to FIG. 1, the following will schematically describe an example of a known type of bedding dispensation apparatus in order to highlight the problems thereof that need to be solved.

The apparatus comprises the following main parts.

Loading station 1: in the lower part of the machine, a hopper allows for manual loading of the bedding, which is then stored therein.

Transportation system 2: it can be implemented by using different technologies (e.g., vacuum-operated systems, augers, cables and mechanical conveyors), and moves the bedding from the loading station 1 to the dispensing station 3, which is usually situated in the upper part.

Dispensing station 3: located in the upper part of the machine, it receives the bedding from the transportation system 2 and supplies it (usually by gravity) to the dispensation system 4. The dispensing station 3 comprises loading mouths, which are typically two for convenience, so that two cages can be worked on at the same time.

Dispensation system 4: it permits dosing the bedding being discharged into the cages underneath (not shown). It may be implemented by using different technologies (e.g., gravity-operated gate valves, augers, mechanical systems).

Suction system 5: it is located in the area of the cages to suck in the dusty part of the bedding generated during the loading and dispensing phases, so as to reduce to a minimum the inhalation thereof by the operator.

The various solutions employed by the apparatuses known in the art suffer from a number of problems that have been known for a long time and have not yet been solved:

Height and handling. This type of apparatus often exceeds 2 m in height because: it is necessary to provide a loading hopper having a certain capacity (to ensure a good working margin between one manual loading and the next); ergonomics rules must be observed (loading plane not taller than one metre); the bedding must be handled above the loading station while leaving a sufficient gap for positioning the cages, and the angles of the hoppers must be such as to avoid material stagnation. Being movable units that can be used, if necessary, in different rooms, height limits movement, e.g., through doors, and also requires particular care to avoid dangerous falls.

Construction complexity. The presence of lower and upper loading stations with a transportation system in between implies the necessity of using complex systems to ensure the proper operation of the system Transportation must be ensured in all conditions and with a large number of bedding types, which often have different behaviours and characteristics. The auger-type systems known in the art are expensive, complex and noisy (and so are mechanical ones); vacuum-operated systems, also of known types, require sealed hoppers to create a vacuum, which their structure must be able to withstand. Dosing systems based on augers, gates or other mechanical systems must try to mediate between dosing precision for different bedding types and construction complexity/cost; this often leads to trade-offs for some bedding types, which either cannot be dosed with good repeatability or require an upgrade to more complex systems.

Ergonomics: the dispensation plane is fixed and, depending on construction constraints, may be located at a poorly ergonomical height, especially for certain operators. This may cause weariness, since the filling operation is a repetitive one.

Necessity for on-board compressed-air systems: many of the above-described systems require the use of compressed air, e.g., for driving the control valves, or for creating a vacuum, or for specific blowing purposes. Compressed air does not always combine well with a movable machine and with the utilities available at the clients' sites.

Creation of "bridges" inside the loaded bedding, resulting in missed dispensation. Some beddings are very light and, notwithstanding the design angles of the hoppers, "holes" may form within the load: such empty regions will not allow the bedding to flow towards the dosage point, resulting in the dosing process being blocked.

SUMMARY OF THE INVENTION

It is therefore the object of the present invention to propose an apparatus for dispensing bedding inside of breeding cages for use in pharmaceutical preclinical research centres and a method of using said apparatus, which are intended to overcome all of the above-mentioned drawbacks.

The present invention concerns a stand-alone dispensation system that:

uses a single hopper, which can be moved and positioned either into a lower position for loading the bedding, so that an operator can easily load the hopper with the specific bedding, or in an upper position of dispensation, so as to move the dispensation point above the cage supporting plane for filling the cages. The supporting plane is arranged at a suitable height. As the hopper is moved upwards, the loading plane, which in the lower position is pressed against the dispensing mouths (to make the system more compact and move the hopper as low as possible) moves away from the mouths by means of sliding guides, so as to clear a suitable space for laying the cages, which are normally of standard sizes;

uses a simplified auger-type dispensation system capable of accurately treating beddings of any kind;

permits sucking in the dust during both dispensation and loading, by using a single intake system;

preferably, does not require the use of compressed air;

permits adjusting the supporting plane to an ergonomical position for loading the cages;

allows for simultaneous treatment of multiple non-pre-mixed beddings;

employs an innovative bridge breaker system to avoid the formation of bridges in light materials.

The object of the invention is applicable to stand-alone dispensation systems and also—especially as concerns the dispensation and bridge-breaker part—to automatic and robotics-assisted systems.

The present invention relates to an apparatus configured for dispensing bedding inside of breeding cages for use in pharmaceutical preclinical research centres, comprising:

a loading hopper located in the upper part of the apparatus, and adapted to contain the bedding to be supplied to the cages;

at least one supporting plane adapted to support one or more cages, and positioned under the hopper;

actuating means under the hopper, adapted to raise or lower said hopper and said at least one supporting plane;

one or more dosing mouths located in the lower part of the loading hopper, and adapted to feed into the cages given quantities of bedding from the hopper;

a dispensation system adapted to dispense bedding into the cages through said one or more dosing mouths;

a control system adapted to determine said quantity of bedding and to control said actuating means;

a base for supporting the apparatus.

It is a particular object of the invention to provide an apparatus for dispensing bedding inside of breeding cages for use in pharmaceutical preclinical research centres and a method of using said apparatus as specifically set out in the claims, which are an integral part resent description.

BRIEF DESCRIPTION OF THE DRAWINGS

Further objects and advantages of the present invention will become apparent from the following detailed description of a preferred embodiment (and variants) thereof and from the annexed drawings, which are supplied merely by way of non-limiting example, wherein.

In the drawings, the same reference numerals and letters identify the same items or components.

DETAILED DESCRIPTION OF SOME EMBODIMENTS OF THE INVENTION

With reference to FIGS. 2-8, the main parts of the apparatus are the following.

A loading hopper located in the upper part of the apparatus, and adapted to contain the bedding to be supplied to the cages.

Actuating means 12 under the hopper, adapted to raise or lower some parts of the apparatus vertically.

In some non-limiting examples of embodiment, the actuating means may be linear electric actuators, or oleodynamic systems, or belts, chains, cables, racks driven by one or more gearmotors. It is also possible to use pneumatic systems as actuating means, adopting measures within the grasp of a person skilled in the art to ensure proper mobility of the apparatus. In a particular example, with reference to the drawings, there are four linear electric actuators at the sides of the apparatus, which are operated concordantly.

Figure 3:
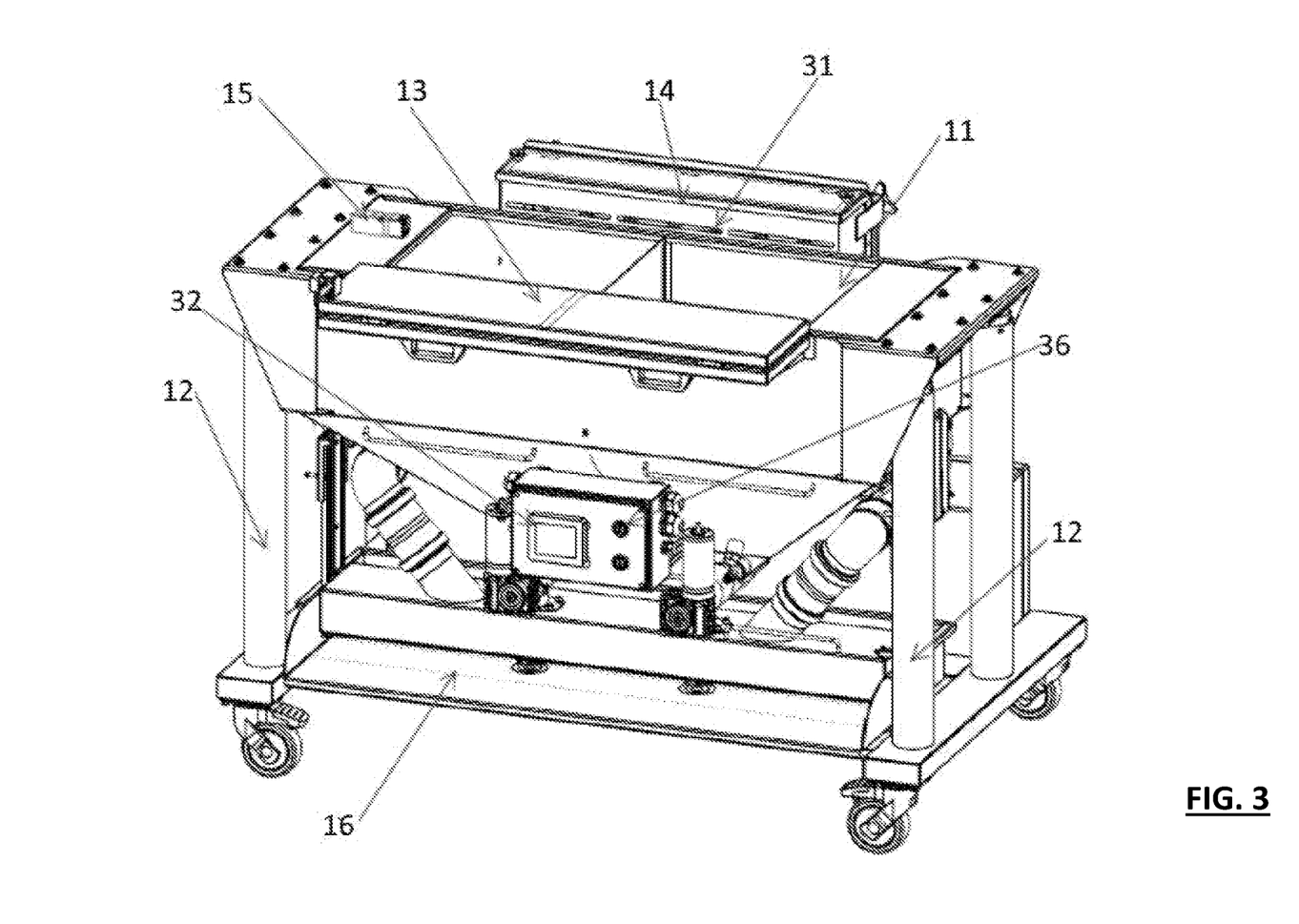
Figure 4:
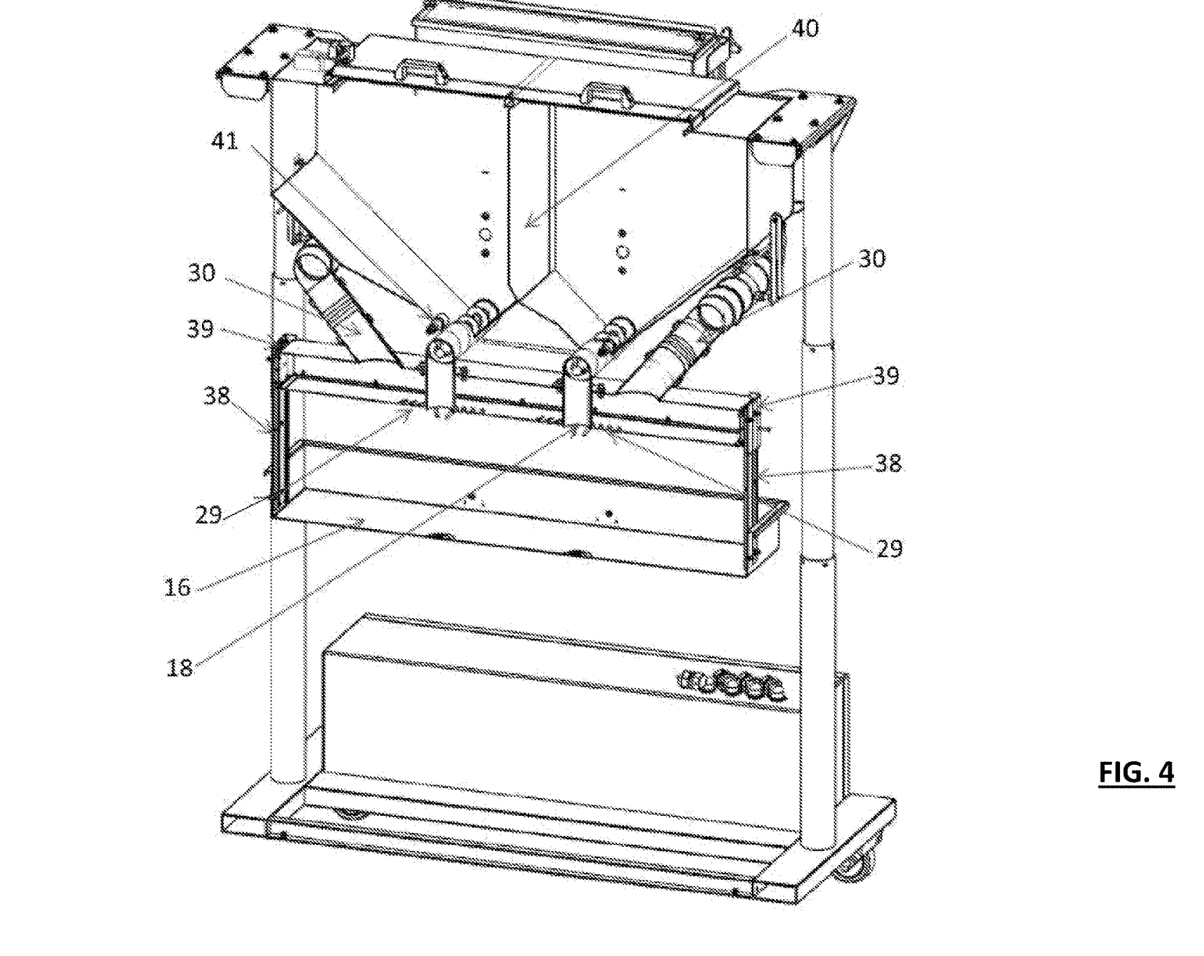
Figure 5:
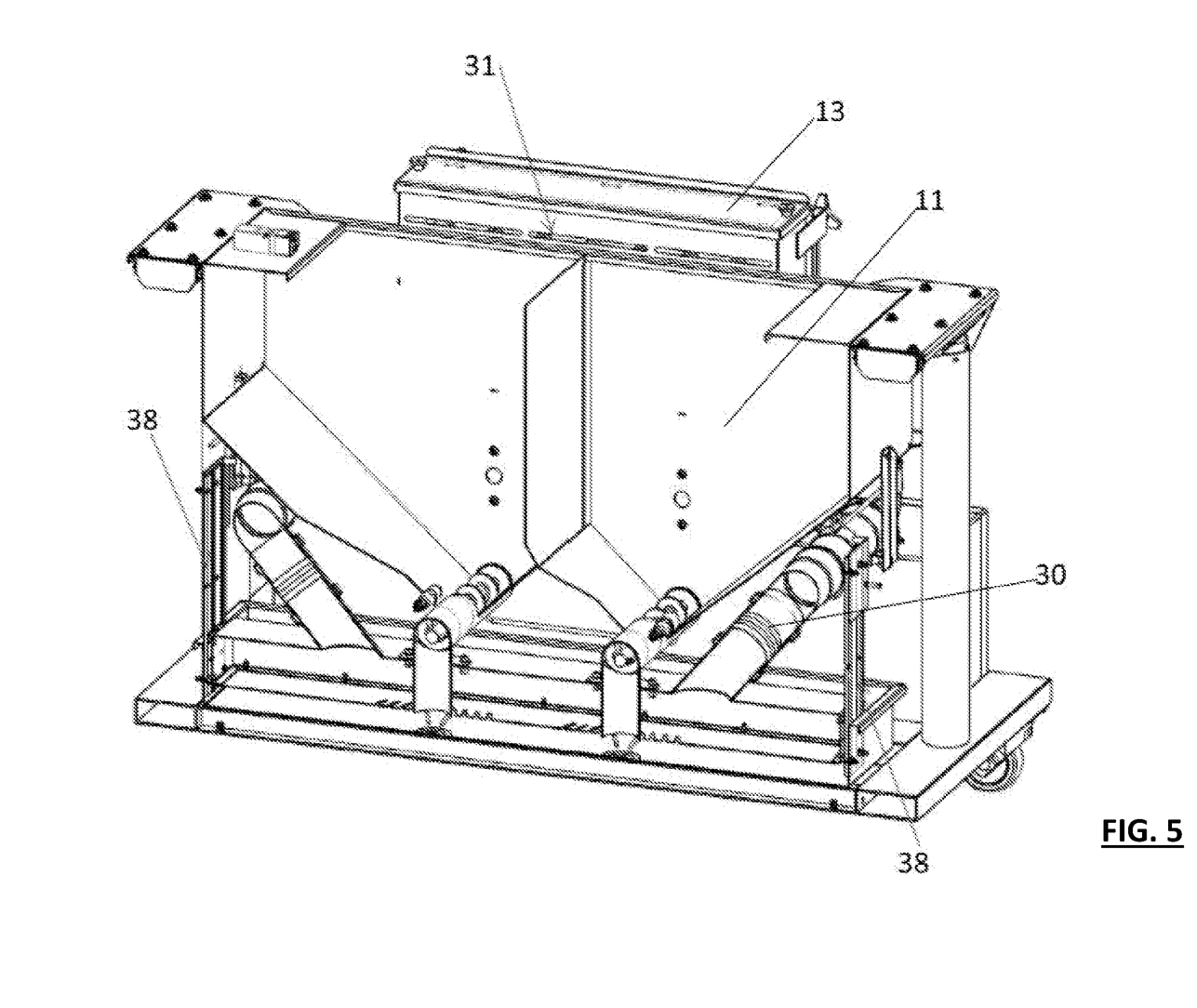
Figure 6:
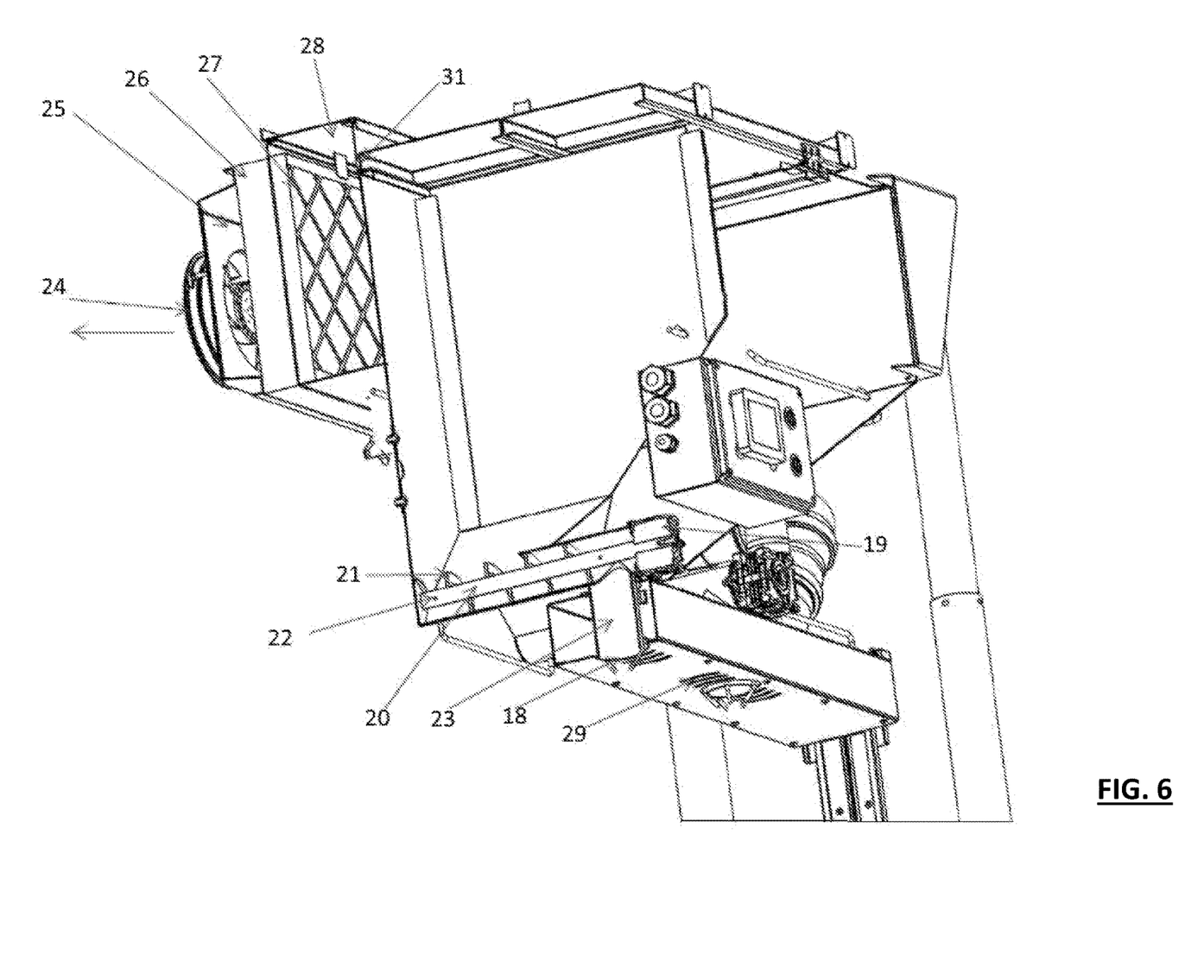
Figure 7:
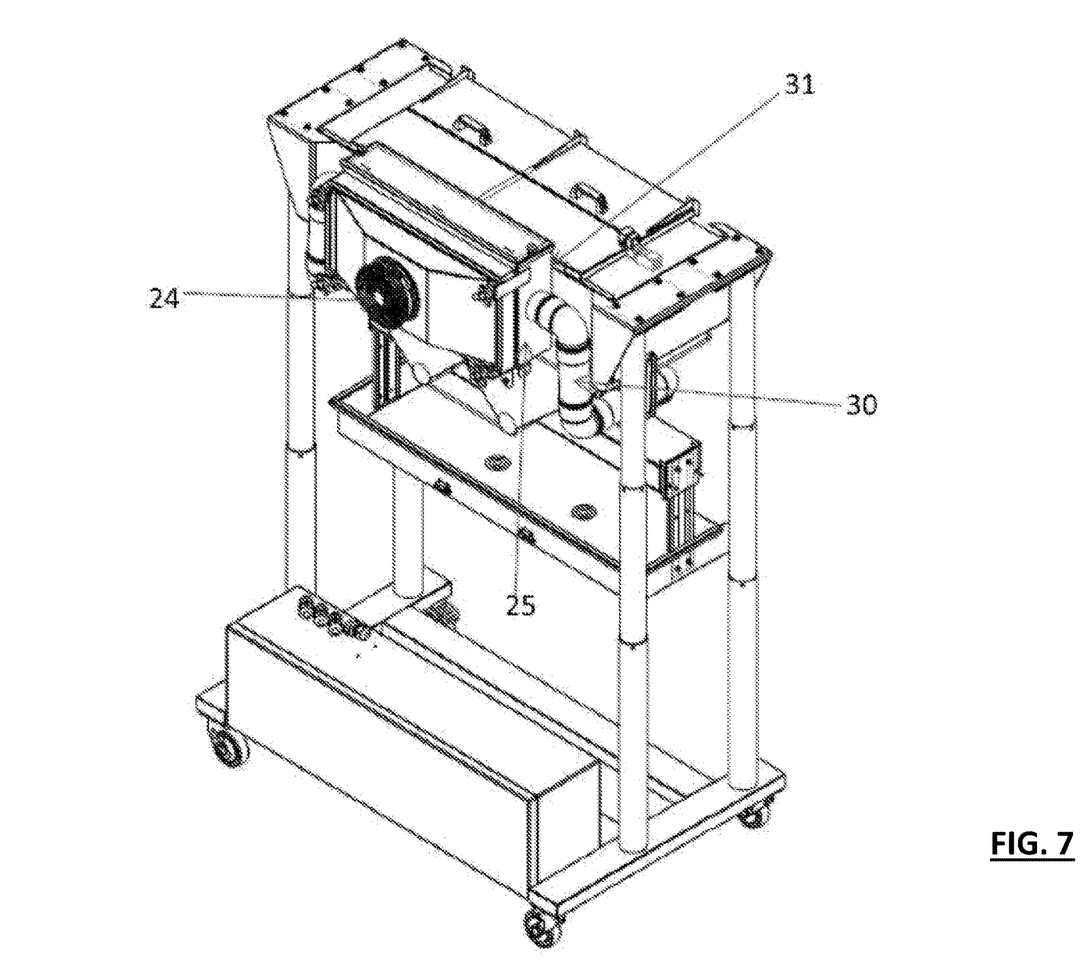

A cover 13 for closing and opening the loading hopper 11, positioned on the top part of the hopper. Said cover is advantageously designed to create, when open, a stable support for facilitating the positioning of a bag of bedding to be poured into the hopper. In a non-limiting example, the cover 13 adopts a book-type opening system and, when open, is in a horizontal position (FIG. 3). Of course, other expedients may be adopted to ensure proper support of the bag of bedding. Moreover, it is conveniently designed to close the intake slot 14, as will be described later on. A suitable safety sensor 15 is preferably inserted to detect when said cover is properly closed.

A supporting plane 16, whereon one or more cages 45 to be filled with bedding are positioned; the supporting plane is located under the hopper at a controllably variable level, as will be described hereinafter.

One or more presence sensors 17, positioned in proximity to the supporting plane, and adapted to sense the presence of one or more cages on the supporting plane, and to allow the bedding to be dosed from the hopper to the cages when they detect that the latter have been positioned correctly under the dosing mouths 18. In one example, the sensors are located on the rear side of the supporting plane, so as to be able to sense the vicinity of the cages.

Dosing mouths 18, located in the lower part of the loading hopper 11, for dosing the quantity of bedding poured into the cages from the hopper. In the non-limiting example there are two of them, but their number may be different, as long as there is at least one per cage to be filled, so that the quantities of bedding to be discharged into each cage are independent of each other.

A dispensation system adapted to dispense bedding into the cages through the dosing mouths 18, and comprising, in a non-limiting example: an auger 22 driven by a motor, e.g., an electric gearmotor 19; the auger comprises a rotating shaft 20, around which a spiral-shaped brush 21 is wound, preferably made out of bristles, although it may be made of any non-rigid material, secured to the surface of the rotating shaft 20.

The material falling from the hopper is moved by means of this dispensation system towards the tube 23, which directs the material towards the dosing mouth 18 that constitutes the end of said tube 23. Each dosing mouth has a dedicated dispensation system, i.e., one per cage to be filled.

An air intake and filtering system that comprises, in a non-limiting example, a suction fan 24 which, through a suitable plenum 25, sucks in air through filters, e.g., a fine filter 26 and a prefilter 27, adapted to trap the dusty part of the intake air. The filtered air is expelled in the rear part of the machine. In one example, the plenum 25 is shaped as a conveyor or diffuser, forming a closed interspace between the fan and the filter.

Such filters are housed in a suitable box 28 and receive air to be filtered (by means of the vacuum created by the fan 24) from:
a) the region near the dosing mouths 18, where suitable intake slots 29 are connected to the filter box by means of suitable channels 30;
b) the region above the rear part of the hopper, where suitable slots 31 are directly connected to the filter box 28. During the normal dispensation process, such slots 31 are suitably closed by the cover 23; in this phase, in fact, said cover must be closed. Otherwise, the sensor 15 will not enable dosage: if the cover is not closed, the augers will not be turned on for the dosage operation due to safety reasons (an operator might inadvertently put his/her hands in the augers). In this way, all the air is sucked through the slots 29 near the dosing system, thus ensuring the utmost suction where most dust is created.

During the hopper loading operation, the cover 23 is opened to clear said slots 31, thus allowing most suction to occur in this region (the box is in direct communication, and therefore the slots 31 are the preferential route for the air flow). During this phase, this region is the one where dust is created. Through a PLC 32 it is possible to set different speeds of the fan in the two phases in order to optimize suction power and noise.

A base 33 for supporting the components of the apparatus, possibly equipped with castors 34 for moving the apparatus.

The loading hopper 11 is mounted on the actuating means 12. Said actuating means are connected to a control unit (not shown, installed in the electric control cabinet 35), which allows for synchronous operation thereof. When said actuating means are in the idle position (minimum elongation), the upper part of the hopper lies at an ergonomical height where bedding can be loaded into the internal compartment of the hopper by simply opening the cover 13.

Once the hopper has been loaded and the cover has been closed, the actuation of a release-type control 36 on the PLC 32 permits raising the linear actuators (the PLC 32 conveniently comprises another release-type control 37 for controlling the descent). During the upward movement, a sliding system (implemented in the non-limiting example described herein by means of linear guides 38) allows the cage supporting plane 16 (initially pressed against the machine bottom) to slide relative to the hopper until sufficient space is created under the hopper for positioning the cages between this plane and the dosing mouths 18. When the necessary distance is reached, a mechanical stop 39 prevents the loading plane from sliding any farther; the latter will thus start rising together with the rest of the hopper: at this point, still by means of the release-type control 36, the operator will be able to position said plane at the desired, and most ergonomical, height.

Figure 9:
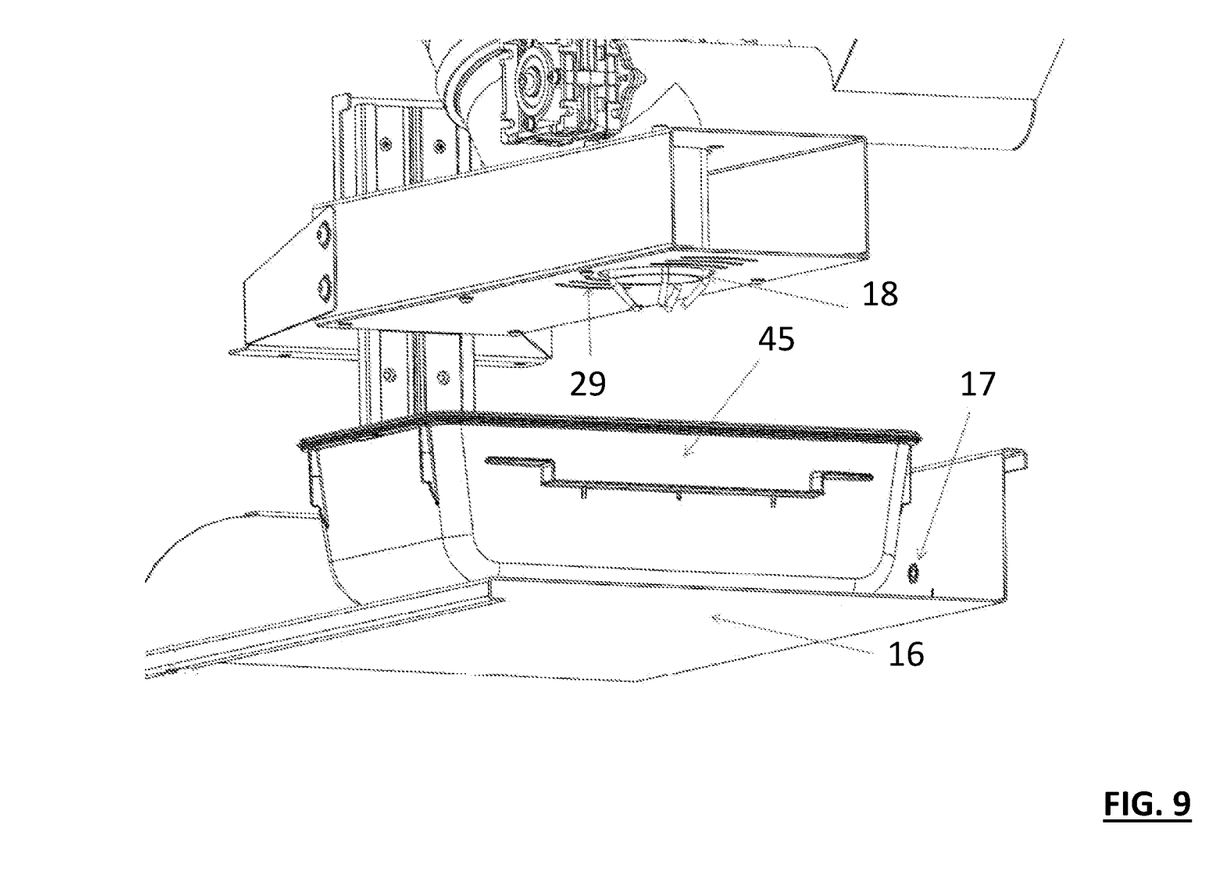
FIGS. 9 and 10 show the complete apparatus and a part thereof with cages positioned on the supporting plane.
Figure 10:
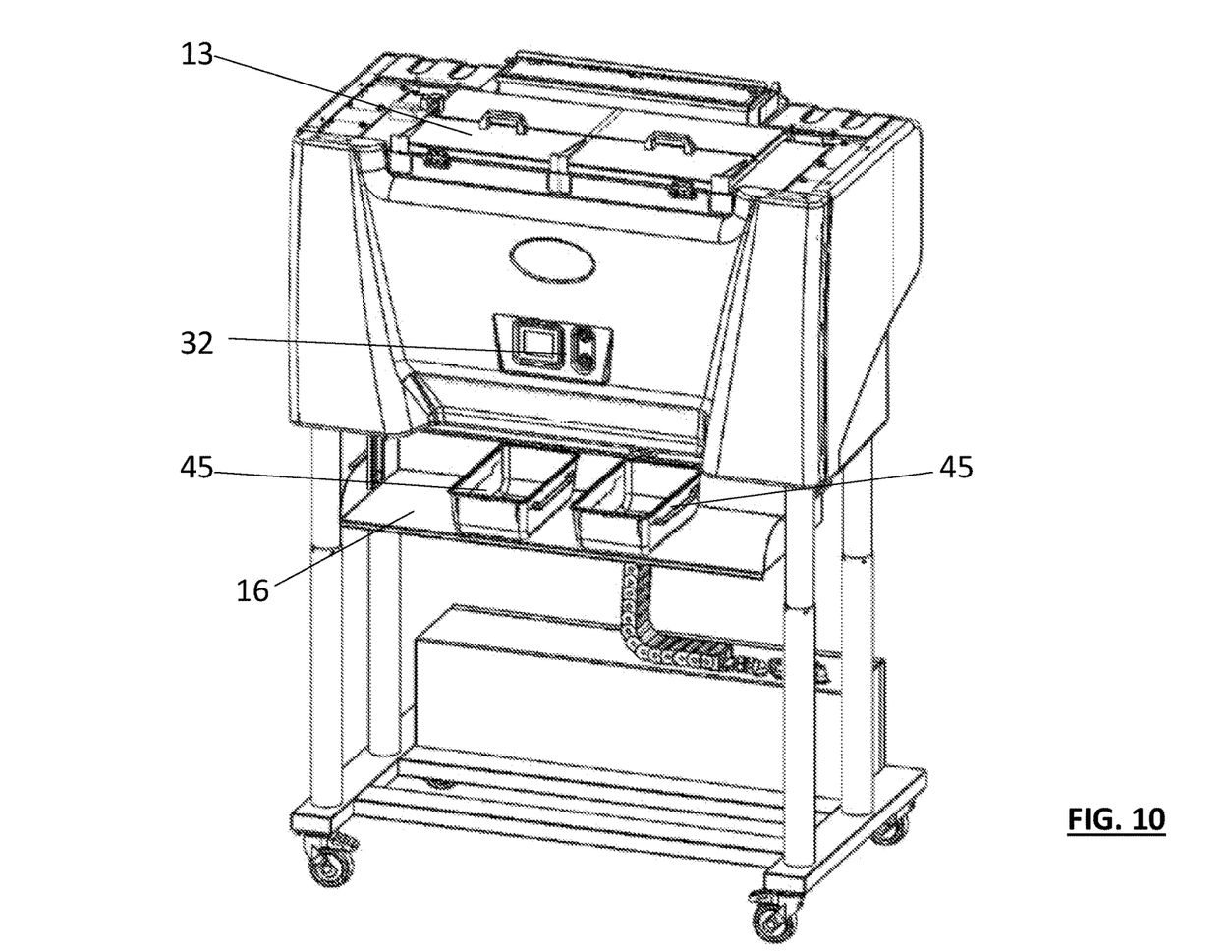

FIGS. 9 and 10 show the complete apparatus and a part thereof with cages positioned on the supporting plane.

After the cages have been appropriately positioned on the supporting plane, it is possible to turn on the dispensation system: when there are cages in the loading zone, the special sensors 17 detect their presence and activate the dosage of the quantity of bedding set in the system: such dosage is effected by means of the brush-equipped auger driven by the motor: it creates "sectors" that get filled with material falling from the hopper 11, which are made to advance by the rotation of the shaft 20. Every revolution of the auger corresponds to a known dosed volume of bedding (depending on the pitch and diameter of the brush); therefore, the quantity to be dosed can be set by adjusting the rotation time of the system. By appropriately choosing the diameter and feeding speed of the auger, the necessary dosage is effected quickly as soon as the cages are positioned under the mouths 18 and detected by the presence sensors 17. In the control PLC 32 it is possible to set different dosage values, which can then be selected by the operator according to the required recipe. The auger conformation makes it possible to hold the material inside the hopper when it is not turning, acting as a plug.

The brush-equipped auger system ensures substantial production savings, in that the system requires neither coupling precision nor rolling bearings. In addition, since bristles (or non-rigid elements) are used, their yieldingness is useful in case of system jamming or overload, because they will let the bedding flow without blocking or clogging the system. While offering such advantages, dosage will still be accurate thanks to the auger.

As already described, during continuous dispensation the fan 24 sucks in air through the channels 30 from the slots in the region near the dispensing mouths 18: such air is filtered by the filters 26 and 27 and expelled in the rear region.

When the hopper is moved into the lower loading position and the cover 13 is opened, the rear slot 31 connected to the intake channel will open, so that the dusts can also be sucked in while loading the bags of bedding.

The whole system is based on electrically powered components, and hence does not require the use of compressed air.

As described, due to the presence of the lifting actuators it is possible to adjust the supporting plane to the most ergonomical height for each operator and for each processing phase by simply acting upon the lifting push-buttons.

The geometry of the hopper may be such as to comprise septa 40 separating the various dispensing mouths: in the non-limiting example shown in the drawings, there are two loading mouths and the hopper is divided in the middle: this makes it possible to load with different beddings the two halves leading to the two separate augers and to conveniently adjust the dispensation time differently for the two beddings. In the area proximal to the auger, level sensors 41 are installed, which warn the operator when the various sectors of the hopper are almost empty.

In addition, advantageously, the lower part of the hopper may have walls 46 inclined towards the dispensation systems, in order to facilitate the conveyance of the bedding to be dispensed towards such systems.

The falling of the material into the auger or, more in general, onto the dosing point, whatever the implementation thereof may be, is a critical aspect because of the very nature of the materials to be processed. Some of these have a low density and a high coefficient of internal friction: this results in situations wherein, notwithstanding the vertical disposition towards the falling point and the use of planes being as inclined as possible to avoid the generation of lateral thrusts that would compact the material, "holes" are formed within the falling material ("bridges" in technical jargon). Such bridges will not allow the remaining material to fall into the auger, thus preventing dosage even though the hopper may seem to be full and the level gauge may show no interruptions.

In order to solve this additional problem, the system described below (FIG. 8) can be applied.

Figure 8:
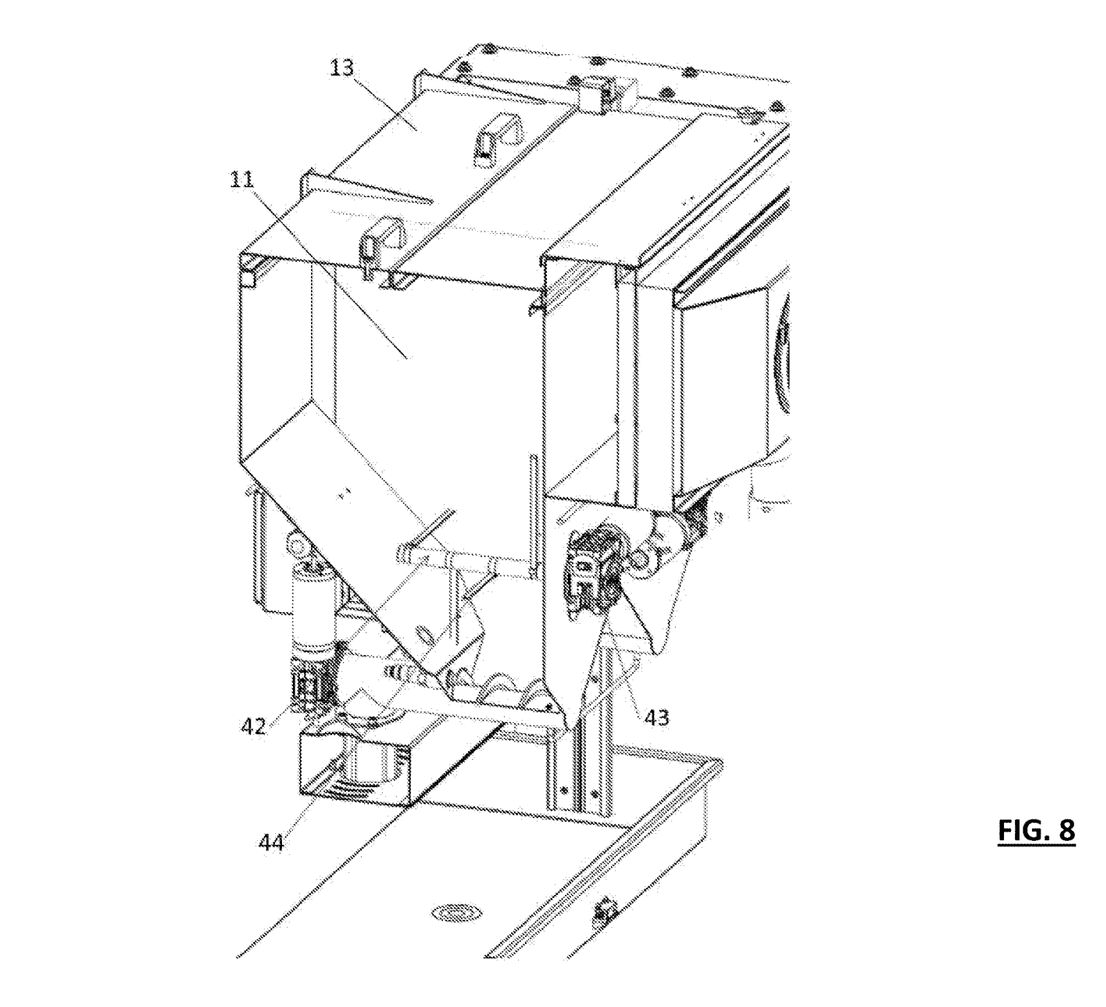

For each dosing mouth, at least one bridge breaker device is arranged within the hopper, comprising: an additional shaft 42 in a suitable position inside the hopper, e.g., over the dispensing auger, at a distance therefrom depending on the size of the hopper and of the auger. When suitably rotated, e.g., by means of an additional gearmotor 43, said shaft rotates flexible elements 44, e.g., having a flat or round shape, fixed to the shaft itself. The rotary motion of these elements, positioned with appropriate gaps and lengths, continuously moves the material and "breaks" any bridges that may have formed, filling the holes and promoting the outflow of the material towards the dosing zone. The revolution speed can be selected in such a way as to obtain this result without affecting the dosage. Also, the lengths of the flexible elements 44 are so defined as to achieve a sliding action against some areas of the hopper: for this reason, they must be flexible and must be made of a material generating low friction with the steel of the hopper.

In this case as well, the system is very simple and economical, and the nature of the (flexible) elements avoids the generation of stresses on the control gearmotor 43, thus preventing the blocking of the system.

The above-described example of embodiment may be subject to variations without departing from the protection scope of the present invention, including all equivalent designs known to a man skilled in the art.

The elements and features shown in the various preferred embodiments may be combined together without however departing from the protection scope of the present invention.

From the above description, those skilled in the art will be able to produce the object of the invention without introducing any further construction details.

The invention claimed is:

1. An apparatus configured for dispensing bedding inside of breeding cages for use in pharmaceutical preclinical research centers, comprising:
 a loading hopper located in an upper part of the apparatus, and adapted to contain the bedding to be supplied to the cages;
 at least one supporting plane adapted to support one or more cages, and positioned under the loading hopper;
 actuating means under the loading hopper, adapted to raise or lower said loading hopper and said at least one supporting plane;
 one or more dosing mouths located in a lower part of the loading hopper, and adapted to feed into the cages given quantities of bedding from the loading hopper;
 a dispensation system adapted to dispense bedding into the cages through said one or more dosing mouths;
 a control system adapted to determine said quantity of bedding and to control said actuating means;
 a base for supporting the apparatus.

2. The apparatus as in claim 1, further comprising one or more presence sensors positioned in proximity to said at least one supporting plane, and adapted to detect the presence of one or more cages on said at least one supporting plane, and adapted to send a consent signal to said control system for said bedding dispensation when the one or more presence sensors sense that said one or more cages have been positioned correctly under said one or more dosing mouths.

3. The apparatus as in claim 1, further comprising an intake and filtering system for air that is present in an area of said one or more dosing mouths and/or in an upper region of the loading hopper.

4. The apparatus as in claim 3, wherein said intake and filtering system comprises:
 a suction fan;
 at least one intake channel between the one or more dosing mouths and said suction fan;
 one or more intake mouths in said upper region of the loading hopper;
 a system for filtering the air taken in by the suction fan.

5. The apparatus as in claim 4, further comprising a plenum between said suction fan and said system for filtering.

6. The apparatus as in claim 1, wherein said dispensation system is located in the lower part of said loading hopper and comprises, for each of the one or more dosing mouths:
 an auger adapted to receive said bedding and adapted to be rotated, and comprising:
  a rotating shaft;
  a spiral-shaped brush wound around said shaft,
  a dispensing tube adapted to receive the bedding from the auger and feed it to a respective dispensing mouth.

7. The apparatus as in claim 1, further comprising a cover for closing and opening the loading hopper, positioned on a top part of the loading hopper.

8. Apparatus as in claim 1, further comprising at least one bridge breaker device inside said loading hopper, the bridge breaker device comprising:
 a shaft adapted to rotate;
 one or more flexible elements fixed to the shaft;
 shaft rotation control means, suitable for determining said rotation in the presence of bedding inside the loading hopper.

9. The apparatus as in claim 1, wherein said at least one supporting plane is positioned at a variable level relative to the loading hopper, and said control system is also adapted to control said variable level to permit loading one or more cages.

* * * * *